(12) United States Patent
Greene et al.

(10) Patent No.: US 11,190,844 B2
(45) Date of Patent: Nov. 30, 2021

(54) IDENTIFYING RELATED VIDEOS BASED ON RELATEDNESS OF ELEMENTS TAGGED IN THE VIDEOS

(71) Applicant: Google LLC, Mountain View, CA (US)

(72) Inventors: Kevin Greene, San Francisco, CA (US); Justin Lewis, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 828 days.

(21) Appl. No.: 15/582,248

(22) Filed: Apr. 28, 2017

(65) Prior Publication Data

US 2017/0238056 A1 Aug. 17, 2017

Related U.S. Application Data

(63) Continuation of application No. 14/166,548, filed on Jan. 28, 2014, now Pat. No. 9,639,634.

(51) Int. Cl.
| | |
|---|---|
| *G06F 16/438* | (2019.01) |
| *G06F 16/9032* | (2019.01) |
| *G06F 16/783* | (2019.01) |
| *H04N 21/466* | (2011.01) |
| *H04N 21/45* | (2011.01) |
| *H04N 21/472* | (2011.01) |

(52) U.S. Cl.
CPC ..... *H04N 21/4668* (2013.01); *G06F 16/4387* (2019.01); *G06F 16/784* (2019.01); *G06F 16/7837* (2019.01); *G06F 16/90328* (2019.01); *H04N 21/4532* (2013.01); *H04N 21/47217* (2013.01)

(58) Field of Classification Search
CPC .......... G06F 16/90328; G06F 16/4387; G06F 16/7837; G06F 16/784; H04N 21/4668; H04N 21/4532; H04N 21/47217
USPC ........................................ 707/723
See application file for complete search history.

(56) References Cited

U.S. PATENT DOCUMENTS

| | | | |
|---|---|---|---|
| 7,685,132 B2 | 3/2010 | Hyman | |
| 8,560,583 B2 | 10/2013 | Mallinson | |
| 2009/0006368 A1* | 1/2009 | Mei | ................ H04N 7/17318 |
| 2009/0083260 A1* | 3/2009 | Artom | ................ G06Q 30/0264 |
| 2009/0132459 A1* | 5/2009 | Hicks | ................ G06N 5/02 |
| | | | 706/52 |
| 2010/0199295 A1* | 8/2010 | Katpelly | ............... H04L 67/306 |
| | | | 725/14 |

(Continued)

FOREIGN PATENT DOCUMENTS

WO WO/2013051014 4/2013

OTHER PUBLICATIONS

Notice of Allowance dated Dec. 22, 2016 in U.S. Appl. No. 14/166,548.
Office Action dated Jun. 23, 2016 in U.S. Appl. No. 14/166,548.

*Primary Examiner* — Joshua Bullock
(74) *Attorney, Agent, or Firm* — Byrne Poh LLP

(57) ABSTRACT

Systems and methods for identifying related videos based on elements tagged in the videos are presented. In an aspect, a system includes an identification component configured to identify tagged elements in a video, a matching component configured to identify other videos that include one or more of the tagged elements, and a recommendation component configured to recommend the other videos for viewing based on a current or past request to play the video.

21 Claims, 11 Drawing Sheets

(56) References Cited

U.S. PATENT DOCUMENTS

| | | | |
|---|---|---|---|
| 2011/0246495 A1* | 10/2011 | Mallinson | G06Q 30/02 707/758 |
| 2011/0246560 A1 | 10/2011 | Gibson | |
| 2012/0323938 A1* | 12/2012 | Skeen | H04L 65/4069 707/754 |
| 2013/0031162 A1 | 1/2013 | Willis et al. | |
| 2013/0159243 A1* | 6/2013 | Wei | H04N 21/26258 706/54 |
| 2014/0023246 A1* | 1/2014 | Bolding | G06K 9/00885 382/118 |
| 2014/0074879 A1* | 3/2014 | Kwon | G06F 16/48 707/769 |
| 2014/0164373 A1* | 6/2014 | Belyaev | G06F 16/48 707/736 |
| 2015/0082330 A1* | 3/2015 | Yun | H04N 21/233 725/14 |

\* cited by examiner

IDENTIFYING RELATED VIDEOS BASED ON RELATEDNESS OF ELEMENTS TAGGED IN THE VIDEOS

CROSS-REFERENCE TO RELATED APPLICATION

This application is a continuation of U.S. patent application Ser. No. 14/166,548, filed Jan. 28, 2014, which is hereby incorporated by reference herein in its entirety.

TECHNICAL FIELD

This application generally relates to systems and methods for identifying related videos based on elements tagged in videos.

BACKGROUND

The proliferation of available streaming content is increasing at exponential levels that will soon reach many millions if not billions of available streaming content for viewing. Conventionally, broadcast media has been provided by television or cable channels that are typically provided by a relatively small number of content providers. However, with the ubiquitous nature of media creation and publishing tools, individuals are able to become prolific content creators. This has resulted in the exponential growth of available streaming content as well as available channels for streaming content. Although users may enjoy the plethora of viewing options associated with available streaming content, searching through this sea of content to find a content of interest to the user is becoming more and more difficult. Accordingly, tools for automatically identifying media content that a user may have an interest in viewing are highly sought after.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
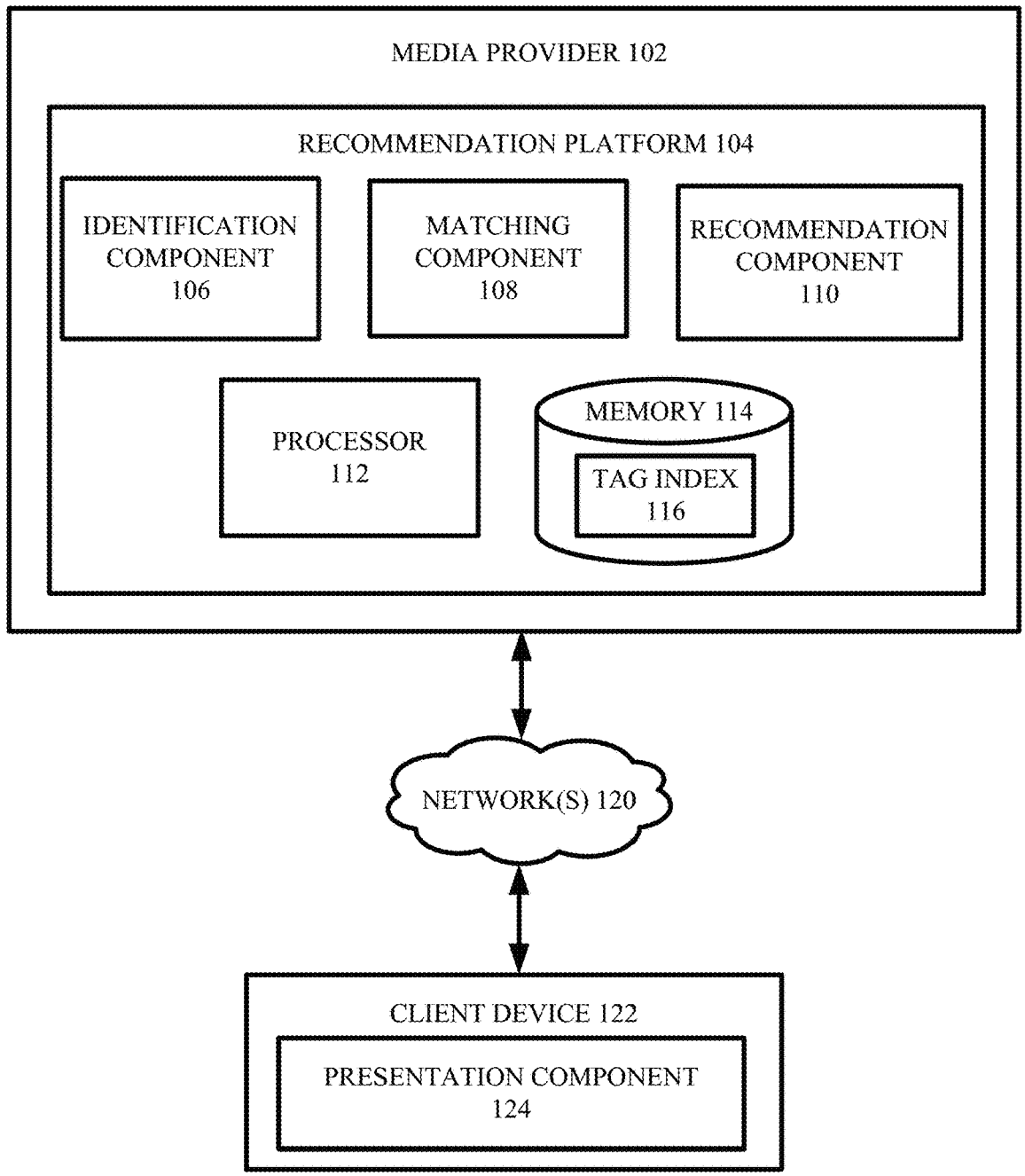
FIG. 1 illustrates an example system for identifying and recommending media content based on relatedness of elements tagged in the media content and another media item in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for identifying and recommending media content (e.g., videos, songs, images, channels, playlists, etc.) based on relatedness of elements tagged in the media content and another media item. For example, a video can include various metadata tags that identify object, things, and/or people appearing in the video. These tagged objects/elements can be employed to identify and recommend other videos related to the tagged objects. For example, other videos can be identified that also include same or similar tagged objects.

In an aspect, where a tagged object is a person, other videos can be identified in which the tagged person appears. For example, when a user watches a video that includes a tagged person named John Smith, other videos in which John Smith appears can be identified for recommending to the user. However in another aspect, where a tagged object is a person, other videos can be identified that the tagged person has expressed an interest in. For example, when a user watches a video that includes a tagged person named John Smith, other videos which John Smith has liked, uploaded, subscribed to, commented on, shared, and/or watched can be identified and recommended to the user. According to this aspect, a relationship between a tagged person appearing in a video (e.g., John Smith) and the user to which recommended videos will be provided can be discerned and employed to facilitate recommending videos to the user. For example, if the user is friends with John Smith and tends to trust Johns Smith's opinion regarding good videos to watch, then videos watched and endorsed by John Smith can be strongly recommended to the user. On the other hand, if the user does not know John Smith, then other videos that John Smith appears in may be only the types of videos that are recommended to the user.

In one or more aspects, a system is provided that includes an identification component configured to identify tagged elements in a video, a matching component configured to identify other videos that include one or more of the tagged elements, and a recommendation component configured to recommend the other videos for viewing based on a current or past request to play the video.

In another aspect, a method is disclosed that includes using a processor to execute the following computer executable instructions stored in a memory to perform the following acts: identifying tagged elements in a video, identifying other videos that include one or more of the tagged elements, and recommending the other videos for viewing based on a current or past request to play the video.

Further provided is a tangible computer-readable storage medium comprising computer-readable instructions that, in response to execution, cause a computing system to perform various operations. These operations include identifying tagged elements in a video, identifying other videos that include one or more of the tagged elements, and recommending the other videos for viewing based on a current or past request to play the video.

Referring now to the drawings, with reference initially to FIG. 1, presented is diagram of an example system 100 for identifying media items for recommending to a user based on relatedness of tagged elements in the media items and another media item associated with the user, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102, client device 122 and one or more networks 120 for connecting media provider 102 and client device 122. Media provider 102 can include an entity configured to provide streaming videos to a client device 122 via a network 120. Media provider 102 includes recommendation platform 104 to facilitate recommending media items to a user based in part on relatedness of tagged elements in the media items and another media item associated with the user. For example, recommendation platform 104 can recommend videos provided by media provider 102 to a user based on relatedness of elements tagged in the videos and elements tagged in a video previously watched by the user. Recommendation platform 104 can include memory 114 for storing computer executable components and instructions. Recommendation platform 104 can further include a processor 112 to facilitate operation of the instructions (e.g., computer executable components and instructions) by recommendation platform 104. It is to be appreciated that although recommendation platform 104 is illustrated as being a component internal to media provider 102, such implementation is not so limited. For example, recommendation platform 104 (and/or one or more components of recommendation platform 104) can be included in client device 122, another content server, a cloud, and/or a media player.

Media provider 102 can include an entity that provides media content (e.g., video, streaming video, live streaming video, images, thumbnails or other static representations of video) to a client device 122 via a network 120 (e.g., the Internet). Client device 122 can include presentation component 124 to generate a user interface (e.g., a graphical user interface or virtual interface) that displays media content provided by media provider 102 to a user of the client device. In an aspect, presentation component 124 can include an application (e.g., a web browser) for retrieving, presenting and traversing information resources on the World Wide Web. For example, media provider 102 can provide and/or present media content to a client device 122 via a website that can be accessed using a browser of the client device 122. In another example, media provider 102 can provide and/or present media content to a client device 122 via a cellular application platform. According to this application, presentation component 124 can employ a client application version of the media provider that 102 that can access the cellular application platform of media provider 102. In an aspect, the media content can be presented and/or played at client device 122 using a video player associated with media provider 102 and/or client device 122.

As used herein the term media content or media item can include but is not limited to streamable media (e.g., video, live video, video advertisements, music, music videos, sound files and etc.) and static media (e.g., pictures, thumbnails). In some aspects, the term media content or media item includes a collection of media items such as a playlist including several videos or songs, or a channel including several videos or songs associated with a single media creator.

A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

In an aspect, media provider 102 can employ one or more networked computing devices to store media content and deliver media content to users via a network 120. The media content can be stored in memory (e.g., memory 114) associated with media provider 102 and/or at various networked devices employed by media provider 102 and accessed via client device 122 using a web based platform of the media provider 102. For example, media provider 102 can include a media presentation source that has access to a voluminous quantity (and potentially an inexhaustible number) of shared media (e.g., video and/or audio) files. The media presentation source can further stream these media files to one or more users at respective client devices 122 of the one or more users over a network 120. In another example, media provider 102 can include any entity that provides videos to users along with other content and services (e.g., a social networking website that provides social networking services and social videos or an educational website that provides educational videos and services).

Client device 122 can include any suitable computing device associated with a user and configured to interact with media provider 102, and/or recommendation platform 104. For example, client device 122 can include a desktop computer, a laptop computer, a television, an Internet enabled television, a mobile phone, a smartphone, a tablet personal computer (PC), or a personal digital assistant PDA. As used in this disclosure, the terms "content consumer" or "user" refer to a person, entity, system, or combination thereof that employs system 100 (or additional systems described in this disclosure) using a client device 122. Network(s) 120 can include wired and wireless networks, including but not limited to, a cellular network, a wide area network (WAD, e.g., the Internet), a local area network (LAN), or a personal area network (PAN). For example, client device 118 can communicate with media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

To facilitate identifying and recommending media content to a user based on relatedness of tagged elements appearing in the media content and a media item associated with the user (e.g., a media item accessed by the user, a media item subscribed to by the user, a media item shared by the user, a media item liked by the user, etc.), recommendation platform 104 can include identification component 106, matching component 108, recommendation component 110 and tag index 116.

Identification component 106 is configured to identify tagged elements/objects in a media item, such as a video. A tag can include a non-hierarchical keyword or term assigned to a piece of information (e.g., a digital image, or computer file) in the form of metadata. This kind of metadata can describe and identify an item and allows it to be found again by browsing or searching. Various techniques have been developed to allow for tagging of objects/elements within a video. For example, a user can annotate a video using a hypervideo authoring tool to manually add tags within the video. Hypervideo techniques can also be utilized, for example, to segment a video into pieces (e.g., into scenes). In addition to manual tagging, other approaches can be utilized to automatically tag elements/objects appearing in videos. For example, facial recognition software can be employed to automatically detect and identify people in the image data of a video. Similarly, audio analysis techniques can be used to automatically annotate words, phrases and sounds occurring at various points throughout a video.

A video can include a variety of metadata tags associated with elements/objects that appear in the video. For example, elements/objects that can be tagged in a video can include but are not limited to: users, actors, places, physical objects, websites, companies, songs, comments, text blurbs, brands, companies, sales, or coupons. In an aspect, metadata tags can be associated with an element appearing in a video at the point where the element appears. For example, metadata tags can be attached to or associated with images of objects where the objects appear in the video. According to this example, when a user interacts with the element or object as it appears in the video (e.g., via moving a cursor over the object, hovering over the object, verbalizing a description of the object, etc.), the metadata tag and/or information associated with the metadata tag, can be revealed to the user. For example, where a user moves a cursor over the face of an actor appearing in the video as the video is playing or paused, tagged information associated with the actor can be provided to the user. In another example, metadata tags can be used to identify audio components of a video (e.g., words, comments, sounds, music, etc.) where the audio components occur.

Metadata tags can include or be associated with text, images or hyperlinks to more information about the object associated with the tag. For example, a tagged element can be represented by a name, an image, a text description, a tool tip or a hyperlink. Subsets of these decorations can be used to describe different elements appearing in a video. For example a tagged image of a person can include a name identifying the person and a link to a social network profile for the person. In another example, a website associated with a video might be represented by a name, image, and description.

In an aspect, identification component 106 can employ a tag index 116 to facilitate identifying tagged elements/objects in a video. For example, tag index 116 can include a look up table with data associating videos (e.g., represented via respective video identifiers (IDs)) with tags (e.g., represented via respective tag IDs) associated with the respective videos. Tag IDs associated with a particular video can further be associated with information identifying frames or time markers in the video where the tagged element or object represented by the tag ID appears. According to this aspect, for a given video, identification component 106 can employ tag index 116 to identify elements or objects that are tagged in the video and/or where the elements or objects appear in the video. In an aspect, a tag ID can include a unique number or character sequence that can further be associated with a metadata identifying, describing, and/or providing more information about (e.g., via a link) the element or object represented by the tag ID. In another aspect, a tag ID can include an actual name or term identifying the object or element represented by the tag ID.

Identification component 106 can identify elements or objects tagged in a video in order to facilitate recommending other media items (e.g., videos, playlists, channels, images, etc.) to a user. In particular, identification component 106 can examine a video associated with a user to identify elements or objects tagged in the video. Matching component 108 can then find other videos related to the video based on overlap of same or similar tagged elements/objects between the video and the other videos. These related videos can then be recommended to the user by recommendation component 110.

A video can become associated with a user in a variety of manners. In an aspect, a video can become associated with a user in response to a current or past request to play the video (e.g., as streamed to client device 122 from media provider 102). According to this aspect, identification component 106 can be configured to identify elements/objects tagged in a video in response to a current or past request to play the video. In turn, recommendation component 110 can recommend videos related to the requested video based in part on similarity of tagged elements/objects in the related videos and the video. The recommended videos can be presented or provided to the user following the request for the video (e.g., via an end cap, in a "what to watch next" section, etc.).

In another aspect, a video can become associated with a user in response to another form of interaction with the video that indicates endorsement of the video by the user, including but not limited to: subscribing to the video or a channel associated with the video, liking the video, sharing the video, commenting on the video, or saving the video for watching later. According to this aspect, identification component 106 can identify a video that is endorsed or associated with a user in some way and then identify elements or objects tagged in the video. The elements or objects tagged in the video can then be used to find other videos having related tagged elements or objects for recommending to the user.

In an aspect, identification component 106 can identify all elements or objects tagged in a video to facilitate finding other videos for recommending to a user. However in other aspects, identification component 106 can identify a subset of elements or objects tagged in the video based on factors personalized to the particular user. For example, a video can include a plurality of tagged elements or objects. However, only a subset of those tagged elements or objects may be pertinent to the user for facilitation of identifying other videos for recommending to the user. According to this aspect, identification component 106 can identify a subset of tagged elements or objects in a video that are personalized to the user. For instance, identification component 106 can examine preferences of the user, demographics of the user and/or social affiliations of the user to pull out a subset of elements or object tagged in a video that are pertinent to the user.

For example, rather than identifying all tagged actors or people appearing in a video, identification component 106 can identify only those tagged actors or people that the user has previously expressed an interest in or that the user has a discernible social connection with. In another example, rather than identifying all tagged locations in a video, identification component 106 can identify locations that the user has expressed an interest in visiting.

In another example, identification component 106 can identify privacy settings associated with tagged people/users in a video regarding revelation of information identifying them as tagged in the video. In particular, in some aspects a tag of a user in a video can be publicly viewable by anyone who has access to a video. However, in other aspects, tags can be associated with privacy access control lists (ACLs) that control who can see the tag. For example Justin could tag Kevin in a video and the tag could be associated with a privacy ACL that restricts others from seeing the tag unless Kevin approves the tag and approves publication of the tag others. Likewise, in association with approving publication of the tag to others, Kevin can restrict what other users can see the tag. For example, Kevin can approve publication of the tag to users classified as friends and disapprove publication of the tag to users classified as family. Thus in an aspect, with respect to a video associated with a user analyzed by identification component 106, identification component 106 can analyze privacy ACLs associated with tags of other users appearing in the video to determine whether the other users have approved publication of the tags, respectively. Identification component 106 can thus identify a subset of other users tagged in a video that have authorized publication of the tags of themselves to the user.

Still in yet another aspect, a tagged element or object in a video can be associated with a social weight that indicates a general and/or relative (e.g., relative to the user) social value associated with the tagged element. For example, other users or groups of users can manually tag elements or objects in a video. Other users can further like, comment or otherwise provide feedback regarding their respective thoughts regarding a tagged object. According to this example, information indicating what user or users applied and/or endorsed a particular tagged element can be associated with a tag for the element. The degree of general endorsement or popularity of a particular tagged item by other users (e.g., as a function of the number of users that endorse the tagged item, recency of endorsement, frequency of endorsement, type of endorsement, etc.) can reflect a general social weight or popularity of the tagged item. Similarly, a known social relationship between other users that tag and/or endorse a tagged object or element and the user can influence a relative (e.g., relative to the user) social weight of the tagged object or element.

According to this aspect, rather than identifying all tagged element/objects in a video identification component 106 can identify a subset of the tagged elements or objects in a video based on a relative and/or general social weight associated with the tagged elements or objects. For example, identification component 106 can identify a subset of tagged objects in a video that are associated with a relative social weight (e.g., relative to a user's personal social relationships with respect to the other users for which the social weight is based) above a threshold value. According to this example, identification component 106 can identify a subset of elements or objects that are tagged in the video by (and/or endorsed by) the user's friends. In another example, identification component 106 can identify a subset of tagged objects in a video that are associated with a general social weight above a threshold value. According to this example, identification component 106 can identify elements or objects that are tagged in a video that are relatively popular amongst a large pool of users.

Matching component 108 is configured to identify other media items (e.g., other videos, channels, playlists, images, etc.) that include one or more of the tagged elements or objects found in a particular video associated with a user as identified by identification component 106. In an aspect, the other media items can be selected from a corpus of identified media items accessible to matching component and provided by media provider 102. For example, identification component 106 can identify all tagged elements/objects in a video (e.g., users, actors, physical objects, places, phrases spoken, songs, etc.) and matching component 108 can find a set of other videos keyed in tag index 116 that also include one or more of the tagged elements/objects. In another example, identification component 106 can identify a subset of tagged objects/elements in a video (e.g., based on user preferences, user demographics, user social circle, social weights applied to the respective objects, etc.) and matching component 108 can identify a set of other videos that include one or more of the tagged objects/elements included in the subset. For example, identification component 106 can identify a subset of tagged people appearing in a video that are socially connected (e.g., as friends on a particular social network) to a user who has requested the video for playing. Matching component 108 can then identify a set of other videos, playlists or channels that include one or more of the tagged people included in the subset. In other words, matching component 108 can identify other media items that include one or more of the user's friends that are tagged in the requested video.

In an aspect, matching component 108 can apply a threshold requirement whereby matching component 108 is configured to identify a set of other videos that include X or more (where X is a number) of the same or similar tagged objects identified in a given video. For example, matching component 108 can be configured to identify a set of other videos that include at least 10 or more of the tagged elements (or subset of tagged elements) identified in a given video. In an aspect, (discussed supra with respect to FIG. 4), other videos identified by matching component 108 can be ranked based on number of common tagged objects between respective ones of the other videos and the particular video being evaluated by recommendation platform 104. According to this aspect, those videos with a greater number of common tagged objects can be ranked higher than those videos with a smaller number of common tagged objects.

Recommendation component 110 is configured to recommend the set of other videos identified by matching component 108 to the user associated with the video from which the set of other videos is based, for viewing by the user. For example, recommendation component 110 can generate a list of recommended videos that includes some or all of the videos in the set of other videos identified by matching component 108. The list of recommended videos can be presented to the user via a user interface generated by presentation component 124.

In an aspect, recommendation component 110 can be configured to recommend to a user, videos identified by matching component 108 as related to a video based on overlap of elements/objects tagged in the respective videos and the video, in response to a past or previous request by the user to play the video. In another aspect, recommendation component 110 can be configured to recommend related videos identified by matching component 108 in response to an indication of an affinity for the video from which the related videos are based. Such an indication can be discerned by recommendation component 110 based on various factors, including but not limited to: a request to save the video to a favorites file, commenting on the video, sharing of the video, subscribing to the video or a channel affiliated with the video, or marking the video as liked.

Figure 2:
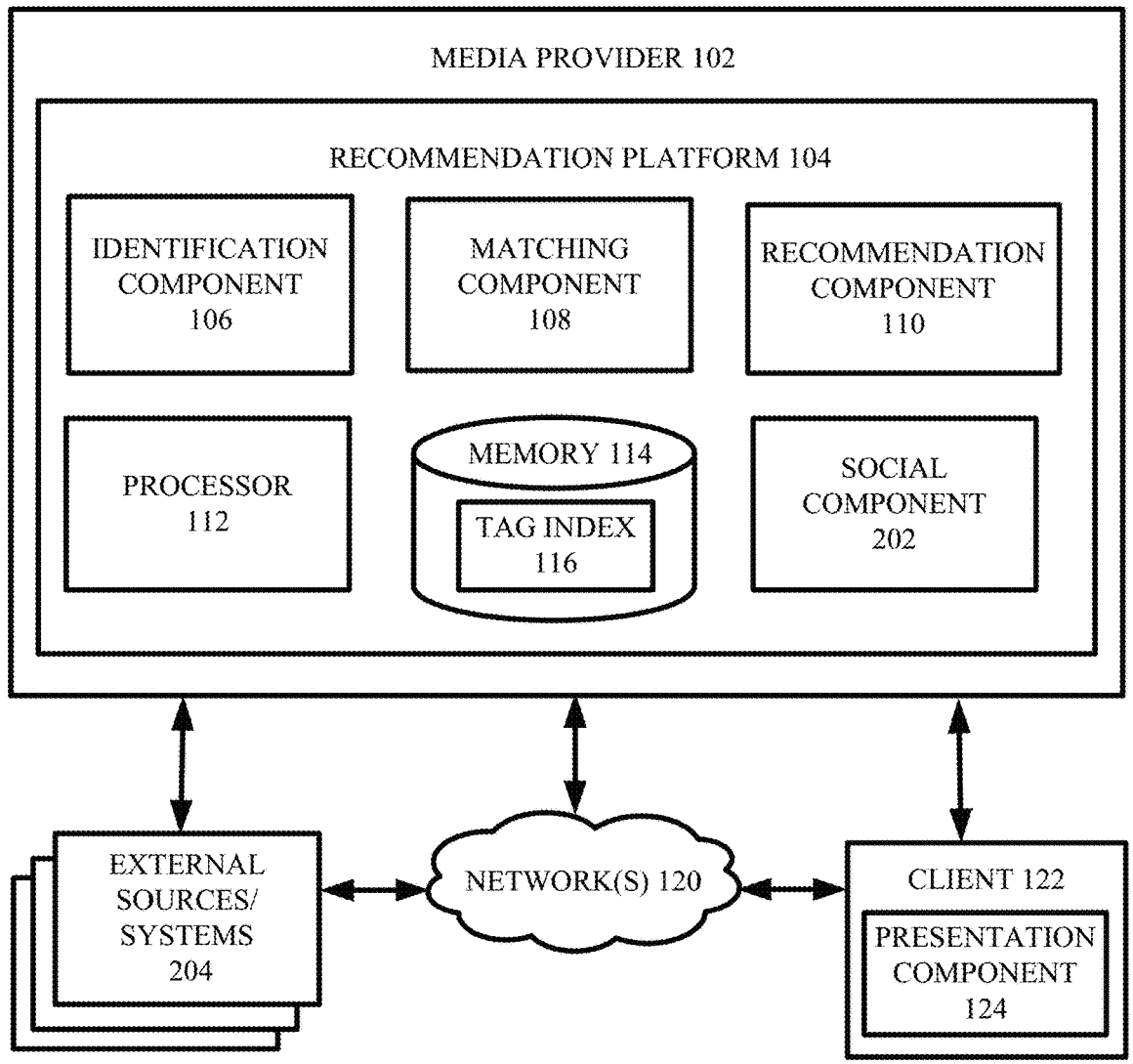
FIG. 2 illustrates another example system for identifying and recommending media content based on relatedness of elements tagged in the media content and another media item in accordance with various aspects and embodiments described herein.

Referring now to FIG. 2, presented is diagram of another example system 200 for identifying media items for recommending to a user based on relatedness of tagged elements in the media items and another media item associated with the user, in accordance with various aspects and embodiments described herein. System 200 includes same or similar features and functionalities as system 100 with the addition of social component 202 to recommendation platform 104 and one or more external system and sources 204. Repetitive description of like elements employed in respective embodiments of systems described herein is omitted for sake of brevity.

Social component 202 is configured to facilitate identifying videos (or other media items) for recommending to a user based particularly in part on similarity of people (or users/actors) tagged in the videos and a given video associated with a user. In particular, with respect to a particular video associated with a user (e.g., a video requested for playing by the user, a video shared by the user, a video subscribed to by the user, etc.), social component 202 is configured to analyze people or other users that are tagged as appearing in the video to determine or infer respective relationships between the user and the people or other users. For example, social component 202 can determine whether the user and another person tagged in the video are socially or professionally related, a type of relationship between the user and the other person, a history of the relationship, a closeness of the relationship, etc. In an aspect, social component 202 is configured to analyze only those other users' tagged in a video that have authorized publication of the tags of themselves in the video (e.g., based on privacy ACLs associated with the respective tags).

Based on a relationship, (and various factors associated with establishment of the relationship noted below), between the user and another user tagged in the video, social component 202 can identify other videos for recommending to the user which the other user has endorsed in some way. For example, social component 202 can identify other videos which the other user has watched or re-watched, favorited, subscribed to, shared, commented on, or uploaded. In another example, social component 202 can identify a channel established by the other user or other videos uploaded by the other users. Other videos that are endorsed by the other user can then be recommended to the user by recommendation component 110. For example, a user John Smith can watch a video that has his friend Amy Andrews is tagged therein. In response to identifying that Amy Andrews is tagged in the video (e.g., by identification component 106) and in response to determination the John Smith and Amy Andrews are friends (e.g., by social component 202), social component 202 can identify a set of other videos that Amy Andrews has endorsed. For example, social component 202 can identify a set of other videos which Amy Andrews has recently watched, commented on and shared with other friends in common between Amy and John. Recommendation component 110 can then recommend this set of other videos to John.

In an aspect, in association with recommending videos to a user, recommendation component 110 can provide information describing how the recommended videos are endorsed by the user appearing in the video from which the recommended videos are based. For instance, in furtherance to the above example, in the set of videos recommended to John, a video can be associated with a description indicating that Amy Andrews watch the video over X times in the past week and has shared the video with N number of other friends in common with Amy and John.

In an aspect, in order to evaluate a relationship between the user and another user tagged in a video, social component 202 can access historical user data associated with media provider 102. For example, social component 202 can examine user profiles established at media provider 102 and historical information regarding user interaction between the users respectively represented by the user profiles. According to this example, social component 202 can identify associations between the user profiles, sharing between the user profiles, commenting on media associated with the respective user profiles, media subscriptions associated with the respective user profiles, and watch histories associated with the respective user profiles.

In another aspect, social component 202 can access various external sources and systems (e.g., via a network 120) to receive information regarding relationships between the user and another user tagged in the video. For example, social component 202 can access social or professional networking systems (e.g., websites) to identify and analyze connections between the user and the other user at the social networking systems. According to this example, social component 202 can determine whether the user and the other user are associated (e.g., as friends, dating, co-workers, family, etc.) at the social networking system, how long the user and the other user have been associated, how frequently the user and the other user connect (e.g., communicate, comment, share, follow, refer, tag one another in media respectively associated with one another, etc.) via the social networking system, what type of connections are made between the user and the other user, whether the user and the other user like or dislike on another, etc.

Based on evaluation of information regarding associations between the user and another user/person tagged in a video, social component 202 can associate a social weight/score with the other user representative of an overall strength of a relationship between the user and the other user. According to this example, a low social weight/score can reflect no relationship or a poor relationship between the user and the other user. For instance, with respect to a relationship between a user and another user tagged in a video, social component 202 can determine or infer a low social score to associate with the other user where the user does not know the other user or have any friends or factors in common with the other user, the user has indicated a disliking for the other user, the user has not commented on media watched by the other user, the user has not established a social connection with the other user at an external social/professional social networking system, etc. Similarly, a high social weight/score can reflect a strong relationship between the user and the other user. For instance, social component 202 can determine or infer a high social score to associate with the other user where the user and the other user have been friends for over Y years, the user and the other user have many friends in common, the user and the other user regularly communicate, the user and the other user are tagged in the same media items together frequently, the user frequently comments on media associated with the user and vice versa, the user frequently shares data with the other user and vice versa, etc.

In an aspect, social component 202 is configured to identify other media items for recommending to a user based on the social weights/scores respectively associated with other users tagged in a video associated with the user (e.g., a video currently or previously requested for playing by the user) and other media items endorsed by the other users tagged in the video. In particular, a social weight/score associated with a user tagged in a video can reflect a degree to which the user trusts the other user's media selection choices or a degree to which the user desires to view media content (or other content) that is endorsed by the other user. Accordingly, based on a social weight score associated with a particular user tagged in a video, social component 202 can identify other media endorsed (e.g., watched, liked, subscribed to, favorited, shared, commented on, etc.) by the other user. For example, social component 202 can identify other media content endorsed by users tagged in a video who are associated with social weight scores above a threshold value. Recommendation component 110 can then recommend the other media content to the user.

Figure 3:
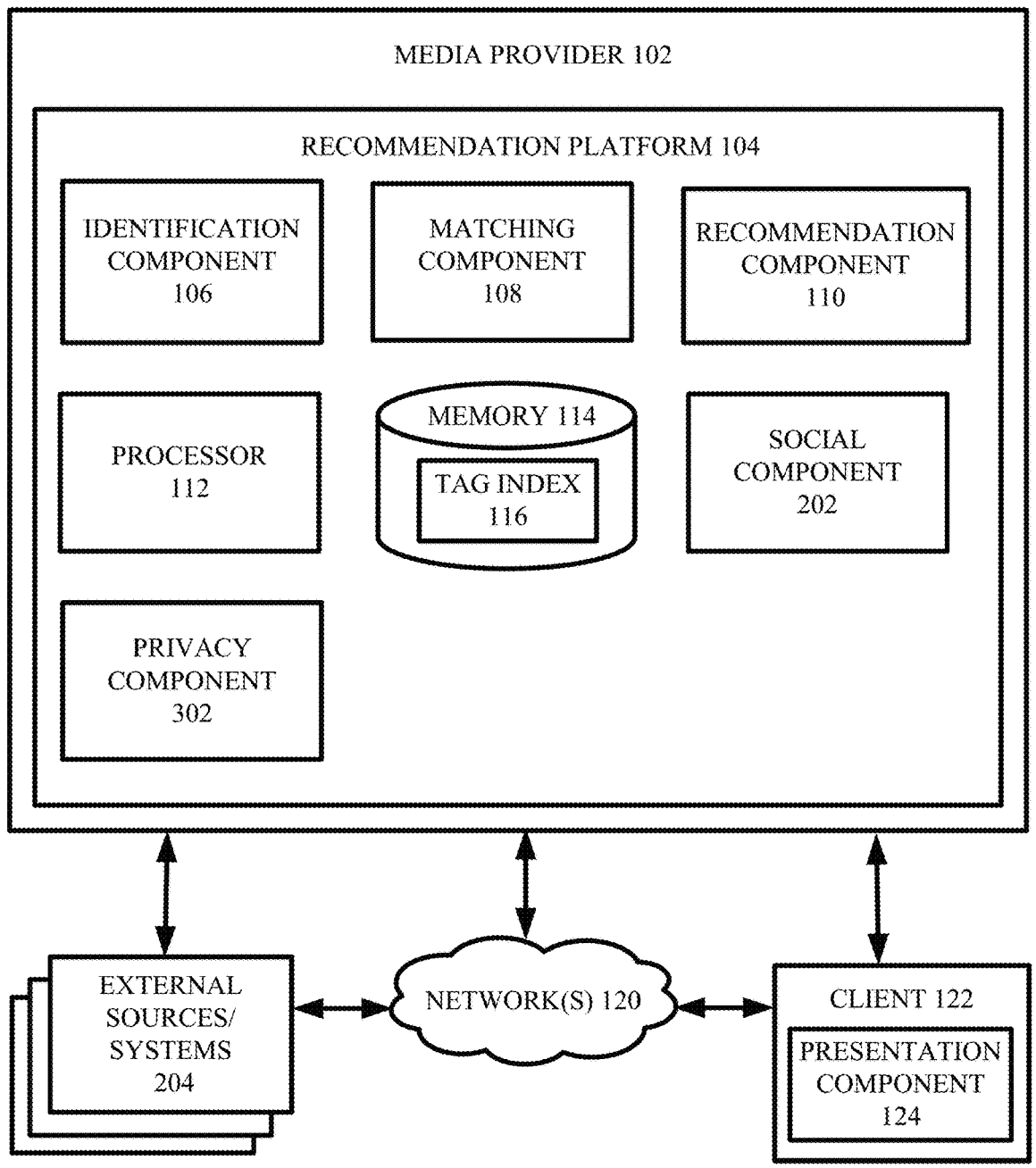
FIG. 3 illustrates another example system for identifying and recommending media content based on relatedness of elements tagged in the media content and another media item in accordance with various aspects and embodiments described herein.

FIG. 3 presents a diagram of another example system 300 for identifying media items for recommending to a user based on relatedness of tagged elements in the media items and another media item associated with the user, in accordance with various aspects and embodiments described herein. System 300 includes same or similar features and functionalities as system 200 with the addition of privacy component 302 to recommendation platform 104. Repetitive description of like elements employed in respective embodiments of systems described herein is omitted for sake of brevity.

Privacy component 302 is configured to facilitate authorizing provision of personal information regarding user endorsement of media items in association with recommending media items based on endorsement of the media items by users tagged in a video. As described above, social component 202 can identify a set of videos for a user that are endorsed (e.g., watched, liked, subscribed to, etc.) be other users tagged in a video associated with the user who are also related to user. For example, social component 202 can identify a user's friends that are tagged in a video watched by the user and then identify a set of other videos the user's friends have endorsed. Recommendation component 110 can then recommend one or more of the videos in the set to the user. In an aspect, social component 202 can identify and analyze only those users tagged in a video who have authorized publication of the tags of themselves in the video to the user (e.g., based on privacy ACLs associated with the respective tags).

In an aspect, a user may not want recommendation platform 104 to be able to recommend videos to others that the user has endorsed. For example, the user may not want others to know what videos he or she watches. For instance, the user may watch a video that he or she would be embarrassed to admit to watching. Accordingly, privacy component 302 is configured ensure that a user has authorized release of information regarding his or her endorsement of a media item (including watching the media item, saving the media item, sharing the media item, uploading the media item, commenting on the media item etc.) prior to release of the information to another user. For example, after a tagged user has been identified by identification component 106, privacy component 302 can analyze information associated with the user regarding authorization of release of data indentifying media items the user endorses to other users. In response to a determination that a user has authorized publication of information identifying a media item included in his or her watch history (or otherwise endorsed by the user) to another user, privacy component 302 can allow recommendation component 110 to recommend the media item to the other user.

According to this aspect, the authorization information can be associated with a profile of the user or otherwise previously associated with the user. For example, media provider 102 can operate in a default mode wherein a user's watch history can be publically provided to any other user or any other user that has been authorized by the user (e.g., the user's friends). However, the user can establish a list of media items on a "do not reveal" list, wherein items on the do not reveal list are hidden from all other users or a defined list of users. In another aspect, privacy component 302 can determine that a user has authorized release of information to another user identifying a media item which the user endorsed in response to prior publication of the information to the other user. For example, the user could post a link to a video provided by media provider 102 at a social networking profile of the user for inclusion in a feed associated with the user's social network profile as a feed item. When the link is posted as a feed item, it can become publically visible to others (e.g., all other user's or a subset of other users as determined based on privacy settings associated with the user's social network profile). Accordingly, privacy component 302 can determine which other user's the feed item is visible to and consider those users authorized to receive information regarding the user's endorsement of the video posted in the feed item.

Figure 4:
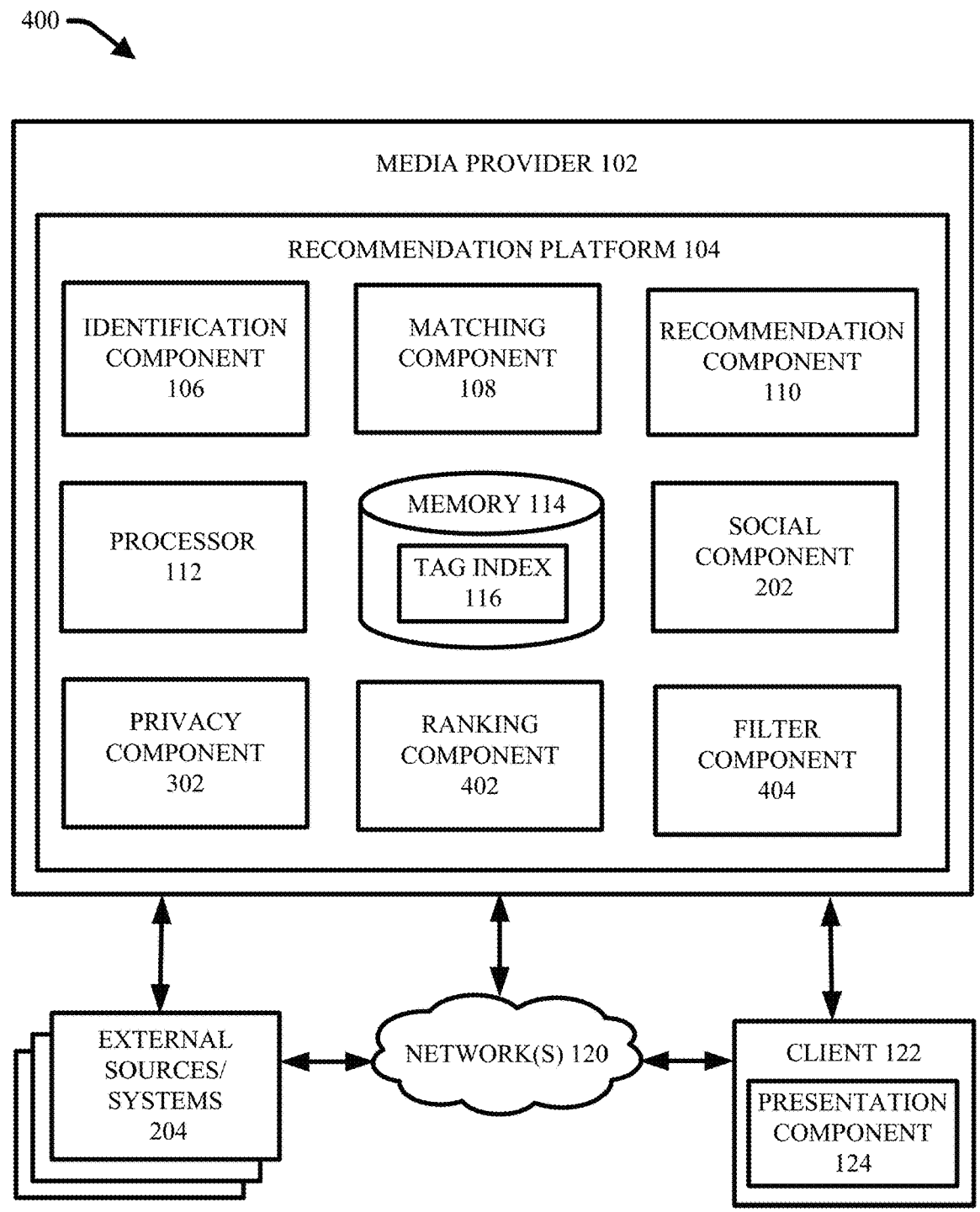
FIG. 4 illustrates another example system for identifying and recommending media content based on relatedness of elements tagged in the media content and another media item in accordance with various aspects and embodiments described herein.

FIG. 4 presents a diagram of another example system 400 for identifying media items for recommending to a user based on relatedness of tagged elements in the media items and another media item associated with the user, in accordance with various aspects and embodiments described herein. System 400 includes same or similar features and functionalities as system 300 with the addition of ranking component 402 and filter component 404 to recommendation platform 104. Repetitive description of like elements employed in respective embodiments of systems described herein is omitted for sake of brevity.

Ranking component 402 is configured to rank or score media items included in a set of media items identified/generated by matching component 108 and/or social component 202 to reflect an inferred degree of interest the user to which the media items will be recommended to has in viewing the media items. Filter component 404 is configured to then filter a set of ranked media items, based on the ranking, to generate a subset of the media items for recommending to a user. For example, filter component 404 can generate a subset of the media items which are associated with a ranking above a threshold value.

Ranking component 402 can consider a variety of factors (as reflected in one or more ranking algorithms employed by ranking component 402) when ranking media items. In an aspect, ranking component 402 can rank media items as a function of number of tags shared between the respective media items and an evaluated video associated with a user. For example, those media items that include a greater number of shared tags can be ranked higher than those media items that include a fewer number of common tags. Ranking component 402 can also consider preferences of the user, demographics of the user and/or social affiliations of the user when ranking media items. For example, in addition to ranking media items based on a general number of shared tagged elements/object with the evaluated media item, ranking component 402 can rank the other media items based on inclusion of a number of priority or star tagged elements. A tagged element can be considered priority or starred based on relevance of the tagged item to the user as determined based on preferences of the user, demographics of the user, and/or social affiliations of the user. For example, with respect to social affiliations, a tagged element that has been tagged and/or endorsed by other users that are friends of the user or otherwise related to the user can be associated with a relative social weight that causes the tagged element to be given priority over other tagged elements.

In another aspect, when considering starred or priority elements, ranking component can rank media items that include a greater number of "popular" tagged elements with a higher ranking. For example, elements that are associated with a generally high social weight value (e.g., based on general number of users that tag the elements, based on frequency of tagging, based on commenting regarding the element, etc.) can be considered popular elements. According to this example, other media items which include a greater number of common (e.g., with respect to the evaluated video) popular tagged elements can be ranked higher than other media items which include a fewer number of common popular tagged elements.

In yet another aspect, ranking component 402 can rank media items based on level of endorsement of the media items by other users related to the user associated with the evaluated media item, wherein the other users are tagged in the evaluated media item. For example, as described above, identification component 106 can identify other users tagged in a video watched by a user (or otherwise associated with the user) and social component 202 can identify a set of media items that are endorsed by the other users. Ranking component 402 can then rank respective media items included in this set based on level of endorsement of the respective media items by the other users, respectively. According to t this aspect, level of endorsement can be influenced by how a media item is endorsed (e.g., watched, shared, commented on, uploaded, etc.) as well as where the media item is endorsed, frequency of endorsement and/or recency of endorsement.

In another aspect, ranking component can further consider closeness of the respective relationships between the other users and the user when ranking the media items included in the set of media items identified by social component 202. For example, ranking component 402 can rank a media item with a higher ranking where the media item is endorsed by another user who is a "best friend" of the user (as determined or inferred based on various factors reflective of the relationship between the user and the other user) as opposed to another user who is merely an acquaintance of the user.

Still in yet another aspect, ranking component 402 can rank media items based on a degree to which an element is tagged in the evaluated media item and the respective media items. In particular, an evaluated video can include a tagged element that appears in a plurality of frames of the video. For example, a video could include a primary actor that appears in almost every frame of the video and a secondary actor that appears in a small minority of the frames. According to this example, ranking component 402 can associate a priority level or star level (as noted above) with the actor that is tagged more frequently in the video. The priority level or star level can also reflect the degree to which the actor appears in the video. When ranking other media items that include the tagged actor, ranking component 402 can rank respective ones of the other media items based on a degree to which the primary actor appears in the other media items. For example, another media item which includes the primary actor appearing in 50% of the video frames can receive a higher ranking thank another media item which includes the primary actor appearing in 30% of the frames.

Figure 5:
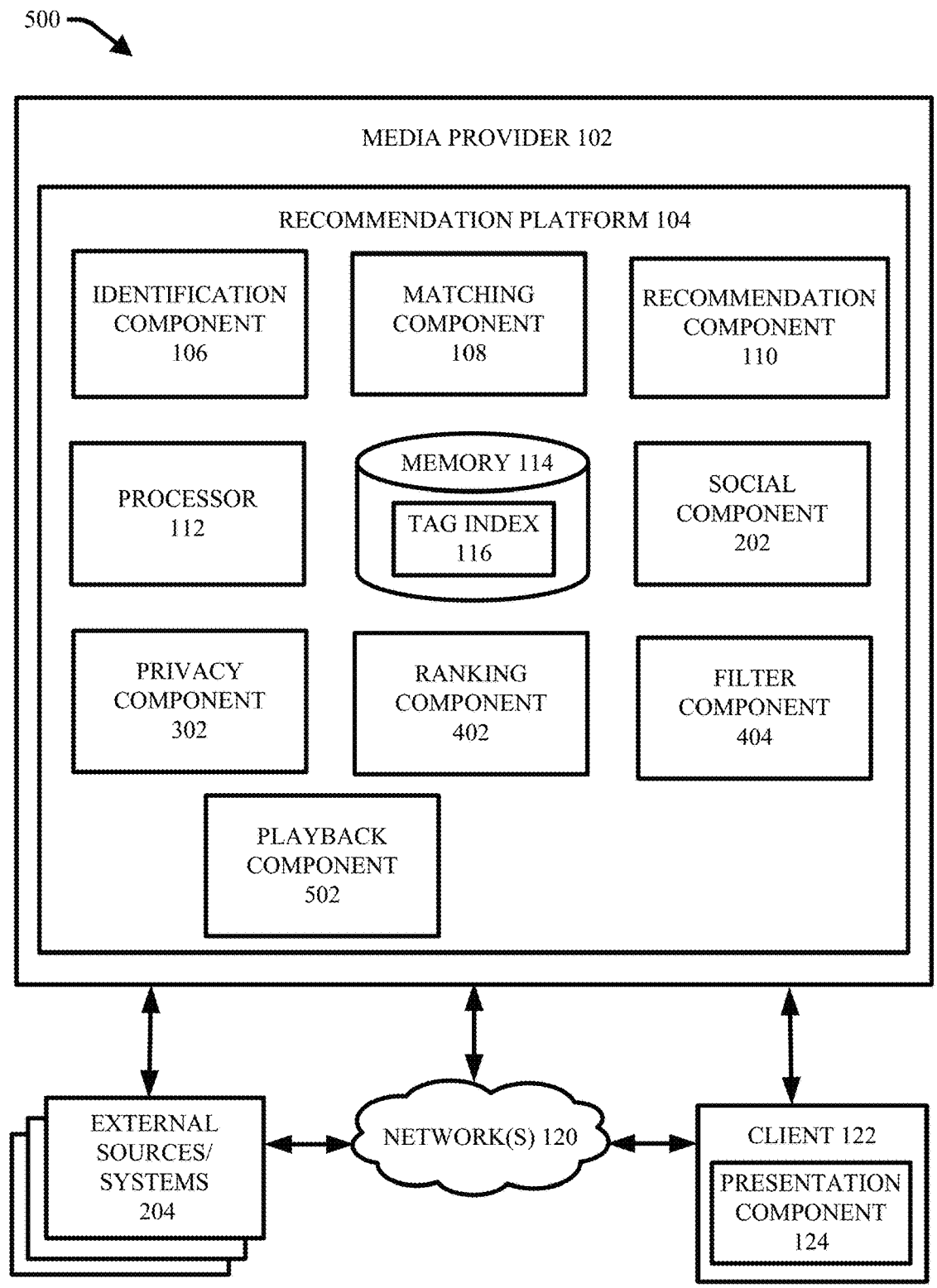
FIG. 5 illustrates another example system for identifying and recommending media content based on relatedness of elements tagged in the media content and another media item in accordance with various aspects and embodiments described herein.

FIG. 5 presents a diagram of another example system 500 for identifying media items for recommending to a user based on relatedness of tagged elements in the media items and another media item associated with the user, in accordance with various aspects and embodiments described herein. System 500 includes same or similar features and functionalities as system 400 with the addition of playback component 502 to recommendation platform 104. Repetitive description of like elements employed in respective embodiments of systems described herein is omitted for sake of brevity.

Playback component 502 is configured to facilitate recommending media items based on elements tagged in a video with respect to playback of the video. In an aspect, playback component 502 track playback of a video requested for playing by a user and determine a point in the video where playback is stopped and/or where the user loses interest in the video. According to this aspect, identification component 106 can identify a subset of tagged elements appearing in the video prior to the point in the video where playback is stopped and/or where the user loses interest. In turn, matching component 108 and/or social component 202 can find a set of other media items based on this subset of tagged elements. Recommendation component 110 can then recommend one or more of the media items in the set (e.g., based on filtering by filter component 404) to the user.

In another aspect, a playback component 502 can facilitate dynamically updating recommended media items during playback of a video based on relatedness of the media items to the video as a function of tagged elements appearing in the video at or near a current point in the video. For example, as a video is playing, identification component 106 can identify a subset of tagged elements appearing in the video at or near a current point of the video. In turn, matching component 108 and/or social component 202 can find a set of other media items based on this subset of tagged elements and recommendation component 110 can recommend one or more of the media items in the set (e.g., based on filtering by filter component 404) to the user at or near the current point of playback of the video. According to this aspect, as playback of the video progresses, the recommended media items can be dynamically updated to reflect element tagged in the video appearing at or near the current point of playback.

Figure 6:
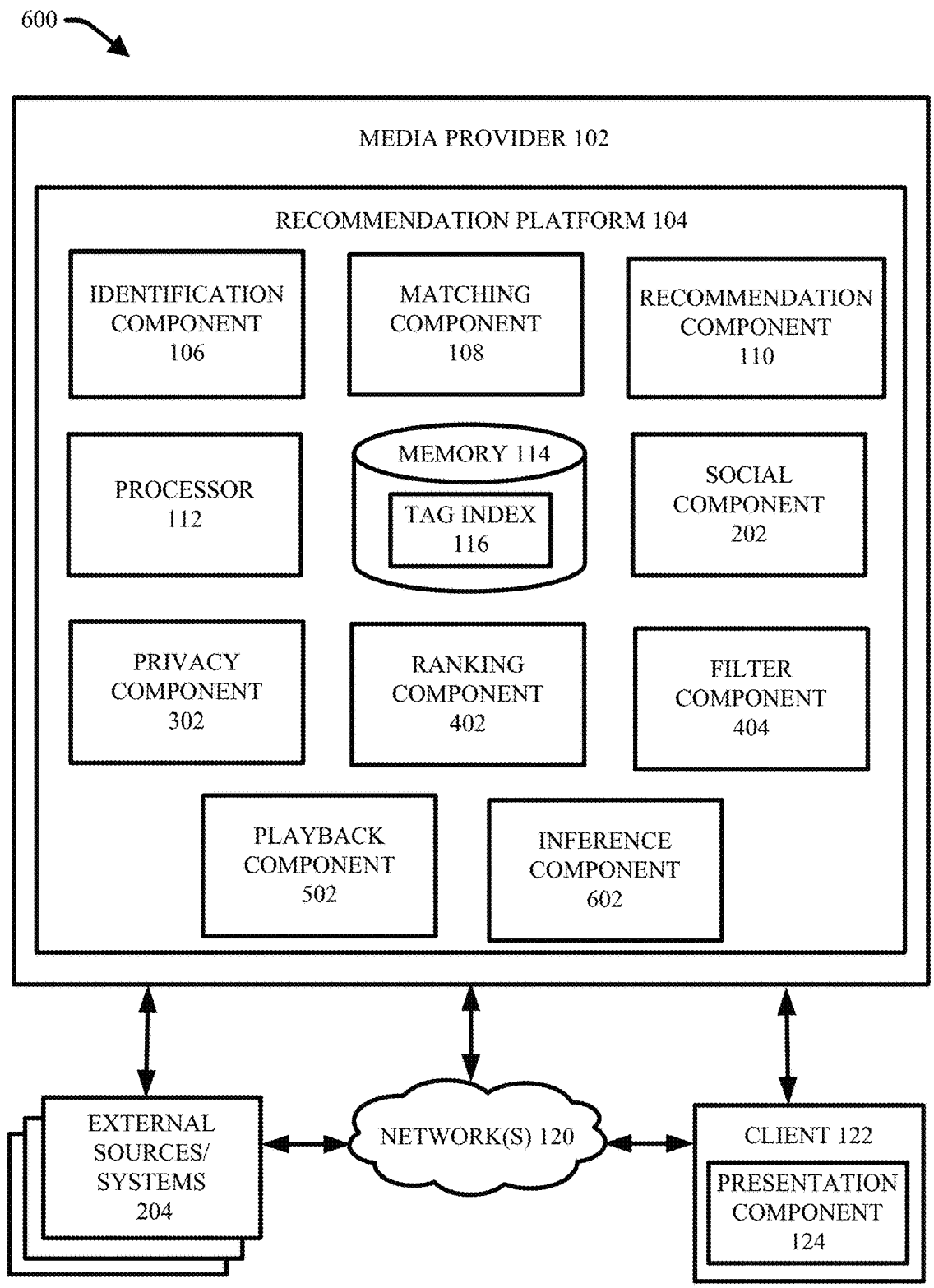
FIG. 6 illustrates another example system for identifying and recommending media content based on relatedness of elements tagged in the media content and another media item in accordance with various aspects and embodiments described herein.

FIG. 6 presents a diagram of another example system 600 for identifying media items for recommending to a user based on relatedness of tagged elements in the media items and another media item associated with the user, in accordance with various aspects and embodiments described herein. System 600 includes same or similar features and functionalities as system 500 with the addition of inference component 602 to recommendation platform 104. Repetitive description of like elements employed in respective embodiments of systems described herein is omitted for sake of brevity.

Inference component 602 is configured to provide for or aid in various inferences or determinations associated with aspects of recommendation platform 104. In aspect, all or portions of media provider 102 can be operatively coupled to inference component 602. Moreover, inference component 602 can be granted access to all or portions of remote content sources, external information sources and client devices.

In order to provide for or aid in the numerous inferences described herein, inference component 602 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
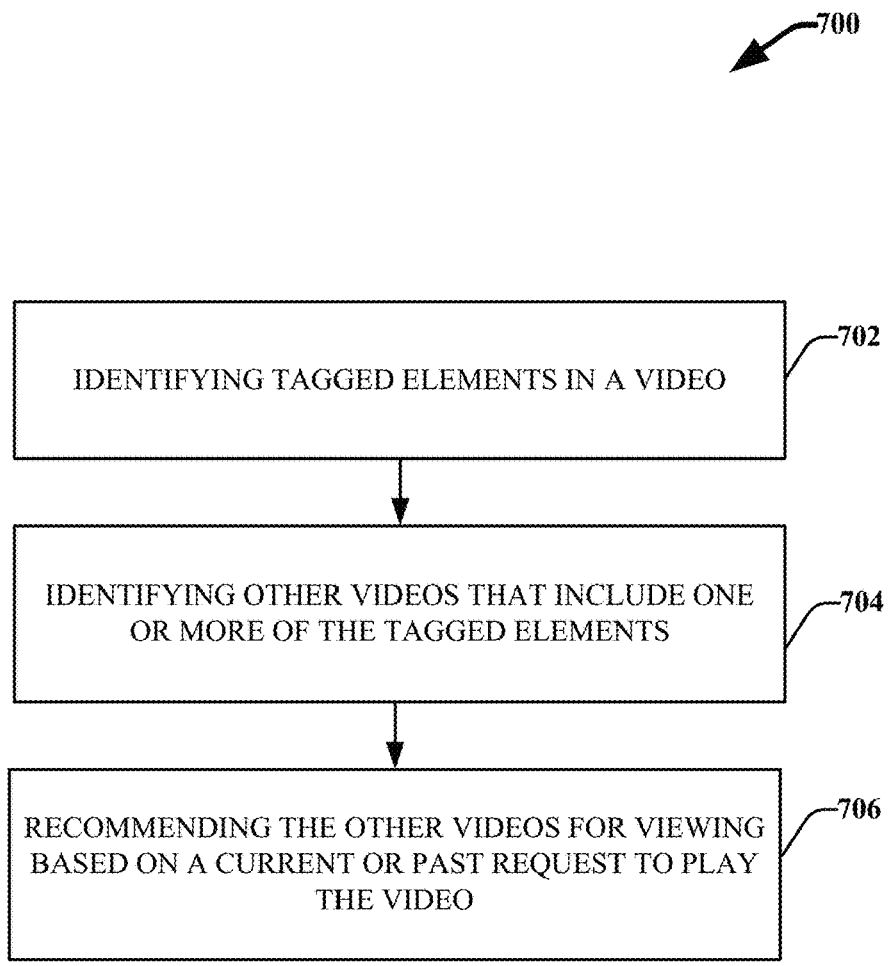
FIG. 7 is a flow diagram of an example method for identifying media items for recommending to a user based on relatedness of tagged elements in the media items and another media item associated with the user, in accordance with aspects described herein.
Figure 8:
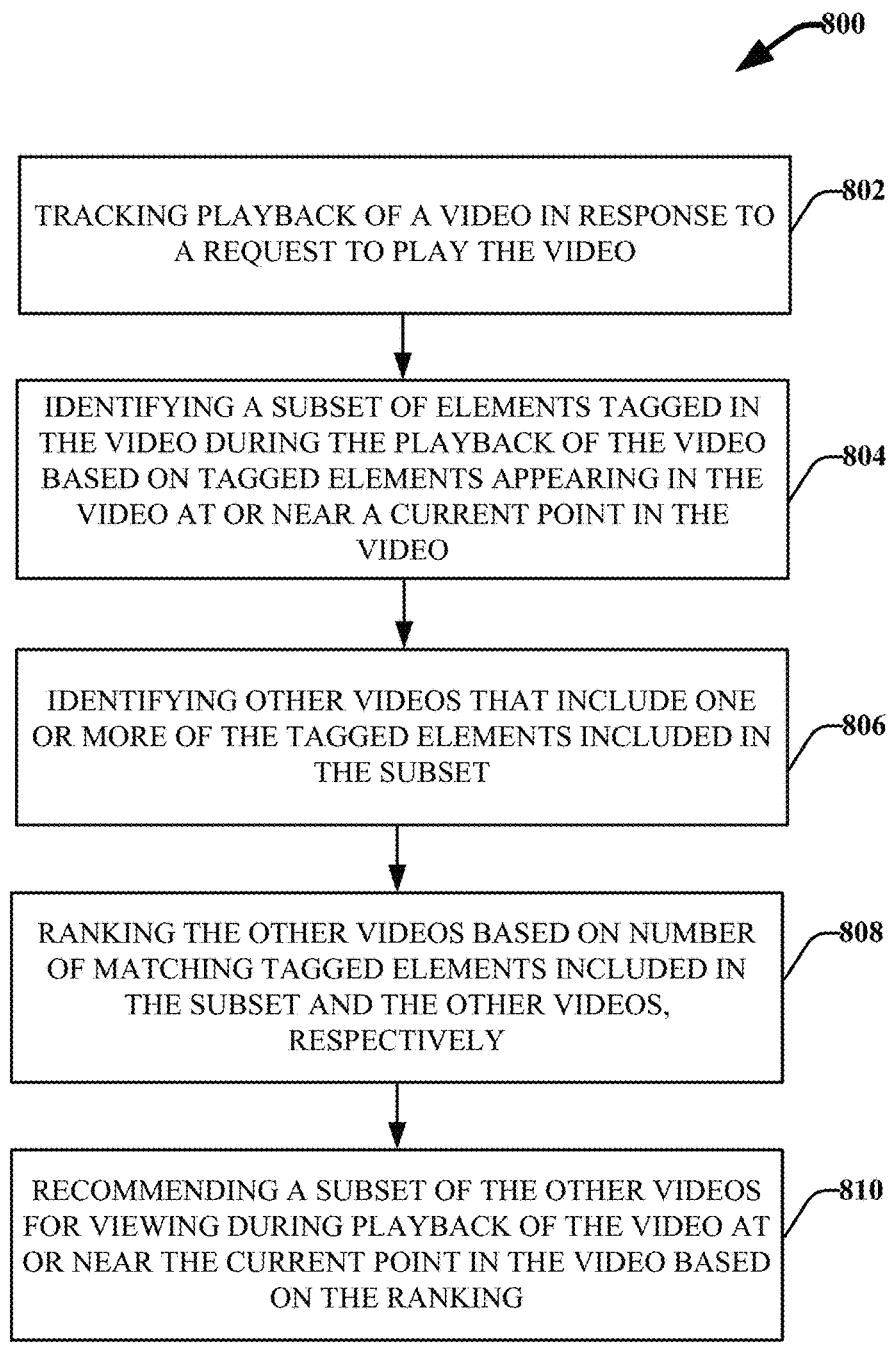
FIG. 8 is a flow diagram of another example method for identifying media items for recommending to a user based on relatedness of tagged elements in the media items and another media item associated with the user, in accordance with aspects described herein.
Figure 9:
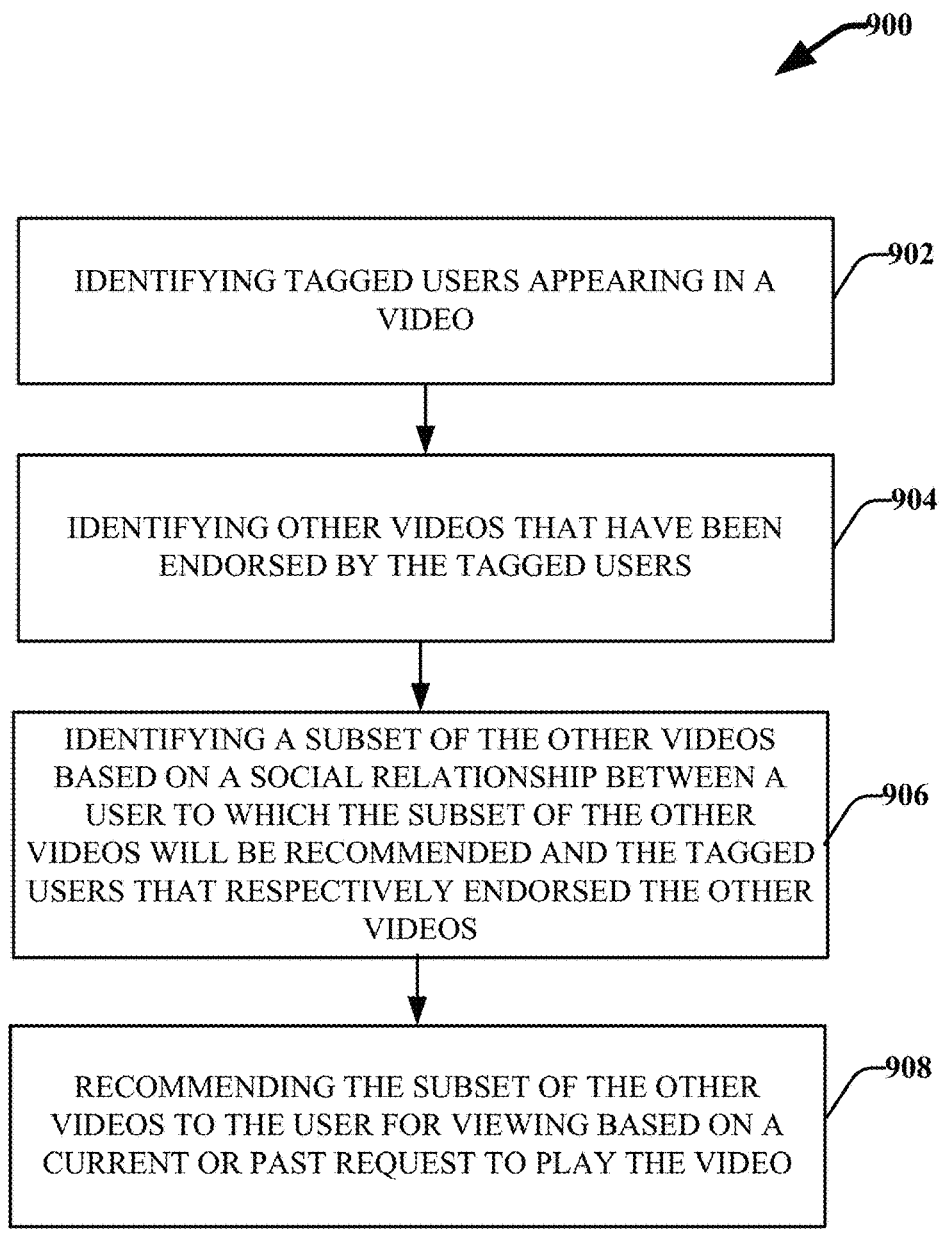
FIG. 9 is a flow diagram of another example method for identifying media items for recommending to a user based on relatedness of tagged elements in the media items and another media item associated with the user, in accordance with aspects described herein.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 for identifying media items for recommending to a user based on relatedness of tagged elements in the media items and another media item associated with the user, in accordance with aspects described herein. At 702, tagged elements appearing in a video are identified (e.g., via identification component 106). For example, users, physical objects, places, music, and phrases occurring in the video are identified. At 704, other videos that include one or more of the tagged elements are identified (e.g., using matching component 108). At 706, the other videos are recommended to a user for viewing based on a current or past request by the user to play the video (e.g., using recommendation component 110).

FIG. 8 illustrates a flow chart of another example method 800 for identifying media items for recommending to a user based on relatedness of tagged elements in the media items and another media item associated with the user, in accordance with aspects described herein. At 802, playback of a video is tracked in response to a request to play the video (e.g., via playback component 502). At 804, a subset of elements tagged in the video are identified during playback of the video based on tagged elements appearing in the video at or near a current point in the video (e.g., via playback component 502). For example, as a video is playing elements that are tagged in the video that are displayed at the current segment of the video being played are identified. At 806, other videos that include one or more of the tagged elements included in the subset are identified (e.g., via identification component 106). At 808, the other videos are ranked based on number of matching elements included in the subset and the other videos, respectively (e.g., via ranking component 402). At 810, the subset of the other videos are recommended for viewing during playback of the video at or near the current point in the video based on the ranking (e.g., via recommendation component 110). For example, as a video is playing, other videos which include X or more elements associated with a current scene playing in the video can be recommended to the user. When the scene changes to a new scene, a new set of videos can be recommend to the user based on the tagged elements appearing in the new scene.

FIG. 9 illustrates a flow chart of another example method 900 for identifying media items for recommending to a user based on relatedness of tagged elements in the media items and another media item associated with the user, in accordance with aspects described herein. At 902, tagged users appearing in a video are identified (e.g., via identification component 106). At 904, other videos that have been endorsed by the tagged users are identified (e.g., via social component 202). For example, other videos which the tagged users have watched, uploaded, commented on or shared can be identified. At 906, a subset of the other videos are identified based on a social relationship between a user to which the subset of the other videos will be recommended and the tagged users that respectively endorsed the other users (e.g., via social component 202 and/or ranking component 402). For example, a subset of the other video which the user's friends have endorsed can be identified. At 908, the subset of the other videos are recommended to the user for viewing based on a current or past request to play the video (e.g., via recommendation component 110).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
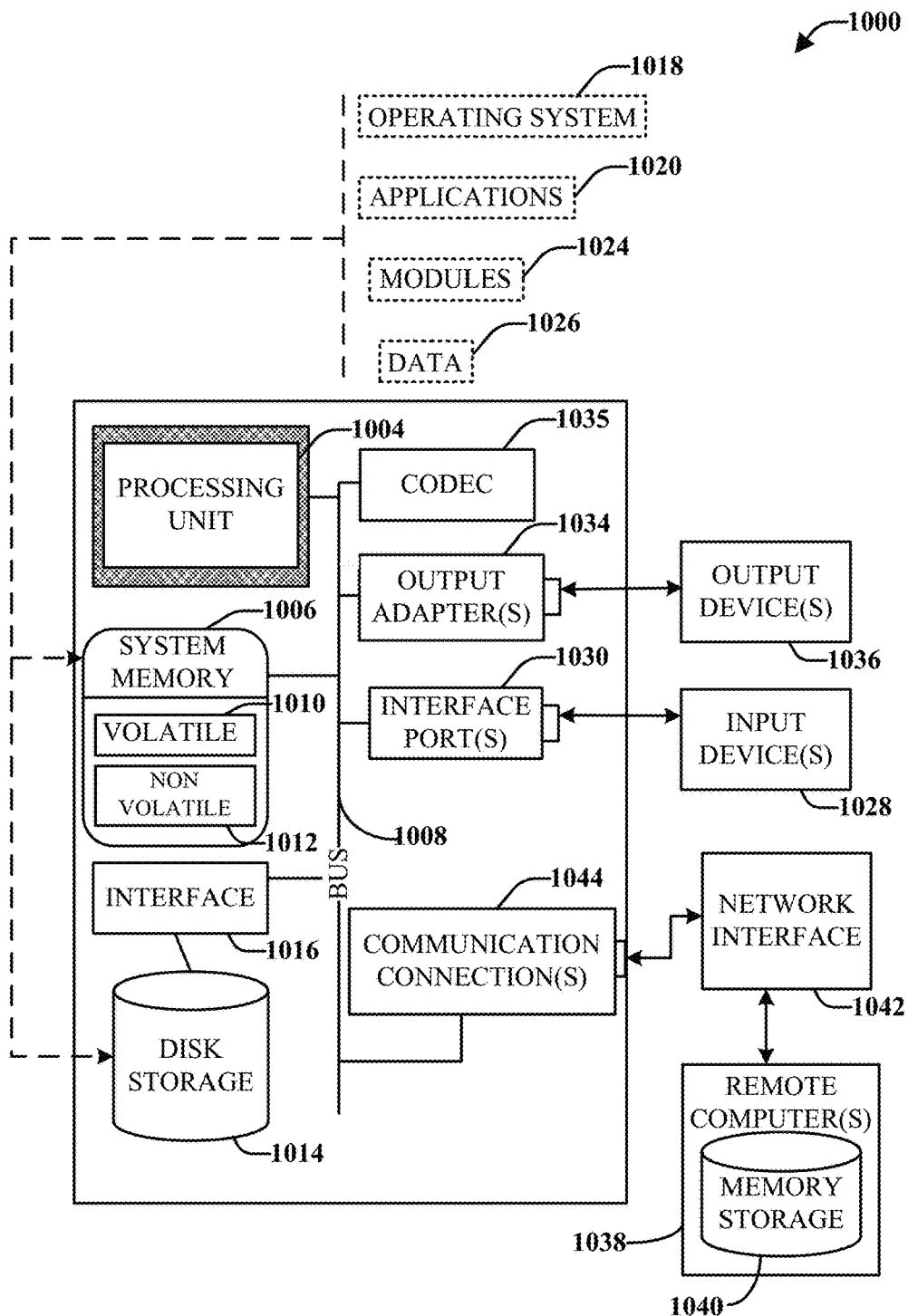
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
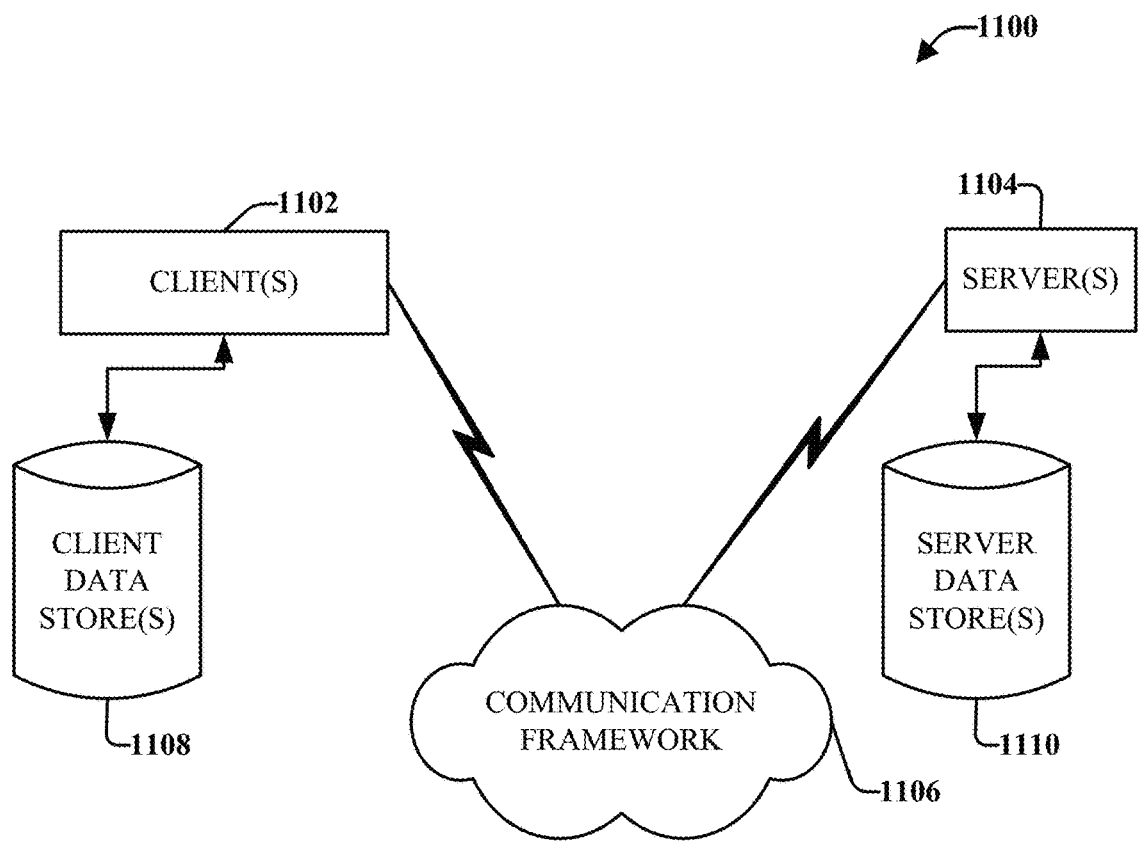
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory; and
   a hardware processor that, when executing computer-executable instructions stored in the memory, is configured to:
      receive a request from a user having a first user account to present a video content item;
      determine a plurality of user accounts that are each associated with an individual appearing in the video content item;
      determine a subset of user accounts from the plurality of user accounts that have each authorized publication of a tag element of the corresponding individual appearing in the video content item;

determine, for user accounts in the subset of user accounts that have authorized content recommendation, a plurality of video content items that have received an endorsement from at least one of the user accounts;

determine a subset of video content items from the plurality of video content items based on a relationship between the first user account and each of the user accounts in the subset of user accounts that have authorized content recommendation; and cause a recommendation that includes at least a portion of the subset of video content items to be presented to the user associated with the first user account.

2. The system of claim 1, wherein the hardware processor is further configured to determine tagged elements in the video content item, wherein the tagged elements include individuals appearing in the video content item.

3. The system of claim 2, wherein the hardware processor is further configured to:

rank the subset of video content items based on a comparison of the tagged elements in the video content item and the tagged elements in each of the subset of video content items; and determine the at least a portion of the subset of video content items based on the ranking.

4. The system of claim 1, wherein the hardware processor is further configured to determine whether the individual appearing in the video content item and having the relationship with the first user account has also authorized the recommendation of the subset of video content items to other users.

5. The system of claim 1, wherein the hardware processor is further configured to present information describing how each of the at least a portion of the subset of video content items is associated with the user account of the individual appearing in the video content item in association with the recommendation.

6. The system of claim 1, wherein the hardware processor is further configured to determine a current playback position associated with the presentation of the video content item, wherein the video content items included in the recommendation are selected based on individuals appearing in the video content item prior to the current playback position of the video content item.

7. The system of claim 1, wherein the hardware processor is further configured to determine a current playback position associated with the presentation of the video content item, wherein the video content items included in the recommendation are selected based on individuals appearing in the video content item corresponding to the current playback position of the video content item.

8. A method comprising:

receiving, using a hardware processor, a request from a user having a first user account to present a video content item;

determining, using the hardware processor, a plurality of user accounts that are each associated with an individual appearing in the video content item;

determining, using the hardware processor, a subset of user accounts from the plurality of user accounts that have each authorized publication of a tag element of the corresponding individual appearing in the video content item;

determining, using the hardware processor, for user accounts in the subset of user accounts that have authorized content recommendation, a plurality of video content items that have received an endorsement from at least one of the user accounts;

determining, using the hardware processor, a subset of video content items from the plurality of video content items based on a relationship between the first user account and each of the user accounts in the subset of user accounts that have authorized content recommendation; and causing, using the hardware processor, a recommendation that includes at least a portion of the subset of video content items to be presented to the user associated with the first user account.

9. The method of claim 8, further comprising determining tagged elements in the video content item, wherein the tagged elements include individuals appearing in the video content item.

10. The method of claim 9, further comprising:

ranking the subset of video content items based on a comparison of the tagged elements in the video content item and the tagged elements in each of the subset of video content items; and determining the at least a portion of the subset of video content items based on the ranking.

11. The method of claim 8, further comprising determining whether the individual appearing in the video content item and having the relationship with the first user account has also authorized the recommendation of the subset of video content items to other users.

12. The method of claim 8, further comprising presenting information describing how each of the at least a portion of the subset of video content items is associated with the user account of the individual appearing in the video content item in association with the recommendation.

13. The method of claim 8, further comprising determining a current playback position associated with the presentation of the video content item, wherein the video content items included in the recommendation are selected based on individuals appearing in the video content item prior to the current playback position of the video content item.

14. The method of claim 8, further comprising determining a current playback position associated with the presentation of the video content item, wherein the video content items included in the recommendation are selected based on individuals appearing in the video content item corresponding to the current playback position of the video content item.

15. A non-transitory computer-readable medium containing computer executable instructions that, when executed by a processor, cause the processor to perform a method, the method comprising:

receiving a request from a user having a first user account to present a video content item;

determining a plurality of user accounts that are each associated with an individual appearing in the video content item;

determining a subset of user accounts from the plurality of user accounts that have each authorized publication of a tag element of the corresponding individual appearing in the video content item;

determining, for user accounts in the subset of user accounts that have authorized content recommendation, a plurality of video content items that have received an endorsement from at least one of the user accounts;

determining a subset of video content items from the plurality of video content items based on a relationship between the first user account and each of the user accounts in the subset of user accounts that have authorized content recommendation; and causing a recommendation that includes at least a portion of the subset of video content items to be presented to the user associated with the first user account.

16. The non-transitory computer-readable medium of claim 15, wherein the method further comprises determining tagged elements in the video content item, wherein the tagged elements include individuals appearing in the video content item.

17. The non-transitory computer-readable medium of claim 16, wherein the method further comprises:

ranking the subset of video content items based on a comparison of the tagged elements in the video content item and the tagged elements in each of the subset of video content items; and determining the at least a portion of the subset of video content items based on the ranking.

18. The non-transitory computer-readable medium of claim 15, wherein the method further comprises determining whether the individual appearing in the video content item and having the relationship with the first user account has also authorized the recommendation of the subset of video content items to other users.

19. The non-transitory computer-readable medium of claim 15, wherein the method further comprises presenting information describing how each of the at least a portion of the subset of video content items is associated with the user account of the individual appearing in the video content item in association with the recommendation.

20. The non-transitory computer-readable medium of claim 15, wherein the method further comprises determining a current playback position associated with the presentation of the video content item, wherein the video content items included in the recommendation are selected based on individuals appearing in the video content item prior to the current playback position of the video content item.

21. The non-transitory computer-readable medium of claim 15, wherein the method further comprises determining a current playback position associated with the presentation of the video content item, wherein the video content items included in the recommendation are selected based on individuals appearing in the video content item corresponding to the current playback position of the video content item.

* * * * *